Feb. 7, 1956  E. G. ORAVEC  2,734,138
ELECTROMAGNETIC VIBRATION EXCITER
Filed Feb. 9, 1953  4 Sheets-Sheet 2

Inventor
Emil G. Oravec
By his attorneys
Howson and Howson

Feb. 7, 1956     E. G. ORAVEC     2,734,138
ELECTROMAGNETIC VIBRATION EXCITER
Filed Feb. 9, 1953     4 Sheets-Sheet 3
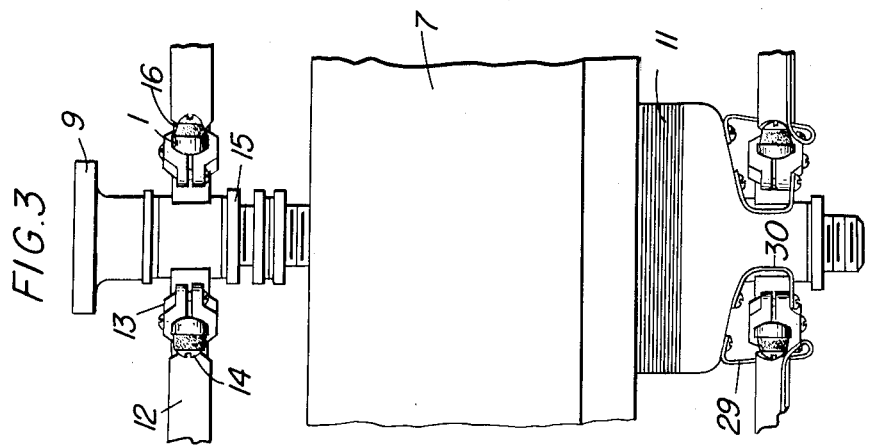
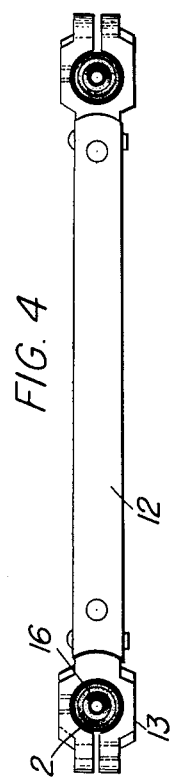
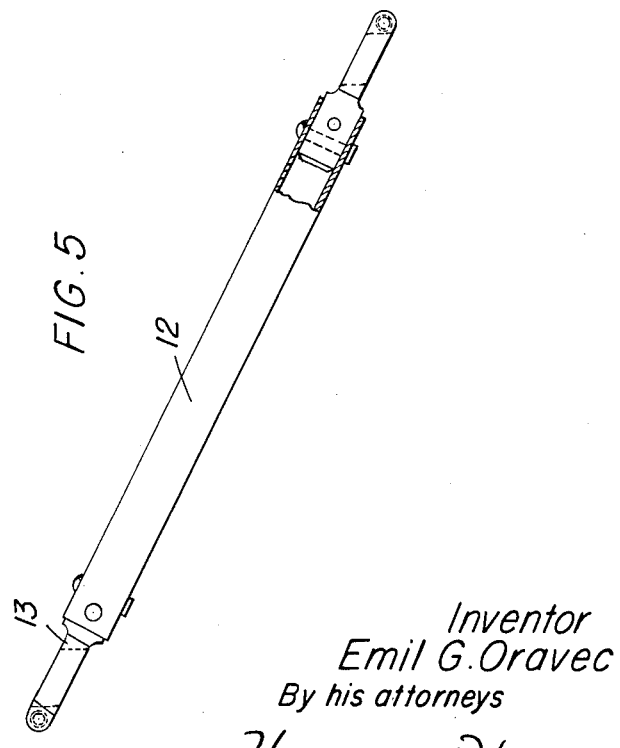
Inventor
Emil G. Oravec
By his attorneys
Howson and Howson

United States Patent Office 2,734,138
Patented Feb. 7, 1956

2,734,138
ELECTROMAGNETIC VIBRATION EXCITER

Emil G. Oravec, New Haven, Conn., assignor, by mesne assignments, to Textron American, Inc., Providence, R. I., a corporation of Rhode Island Application February 9, 1953, Serial No. 335,945

9 Claims. (Cl. 310—27)

This invention relates to vibration exciters and more particularly to mounting means for the moving element or tube of an electrically driven vibration exciter. The moving group of parts of such a machine has in it a vibration test or shake table mounted on a vertical tube passing down through the body of the exciter and supporting a driver coil. The stationary group of parts includes a magnetic structure and a field coil to cooperate with the driver coil. The best manner of mounting the table, tube and driver coil to permit the proper motion of these parts with relation to the stationary field coil and to ensure vertical movement of the table without any extraneous components, has been a complex problem. The present invention provides improved support means for the moving element of a shaker by providing small rubber bushings inserted in a novel manner in the support means.

In the drawings:

Fig. 3 is a detail central side view in elevation of the exciter of Figs. 1 and 2, showing the connection of all four of the central bushings of the pairs of arms to the moving element;

Fig. 4 is a view in elevation, partly from the side, of an arm of Fig. 3 and its two bushings;

Fig. 5 is a plan view of the arm of Fig. 4, showing the angle at which the arm is seen in Fig. 2;

Fig. 6 is a perspective view of one of the bushings of Figs. 1–5; while

The moving element or tube of an electrically driven vibration exciter must be strictly limited to linear reciprocatory movement. The construction of support means to achieve this in a desirable manner has been a problem in the industry. I have discovered the nature of some of the difficulties and how they can be overcome.

One of the forms of mounting means heretofore known is the pivotal type of flexure. I have discovered that the localized galling occurring in the pivotal type where the flexures are joined to the rigid members and the local resonances there can be avoided by the structure shown in the present application. The prior art also has been bothered by free play, fatigue, and extraneous motions. I have found that small rubber bushings incorporated in the support means in the proper geometric manner will not only avoid these difficulties but will introduce additional advantages. For example, where it is desirable to have a very soft suspension and large linear motions, I have found these can be obtained by using rubber bushings of low torsional stiffness. Also, the use of rubber bushings eliminates moving parts so that there is no wear, and good performance persists for an extended period. The bushing gives elastic restraint without the addition of any parts, and eliminates moving parts. The rubber has an inherent damping quality which not only eliminates resonances in the bushing itself but also provides damping forces to the motion of the moving elements. The bushing is very small, adding only a minimum of weight to an assembly which should be extremely light. This is important in terms of keeping the local resonances in the tube itself above the wide operating range of the exciter. I will now describe the bushing, the exciter and the support means of which the bushing is a part.

Figure 6:
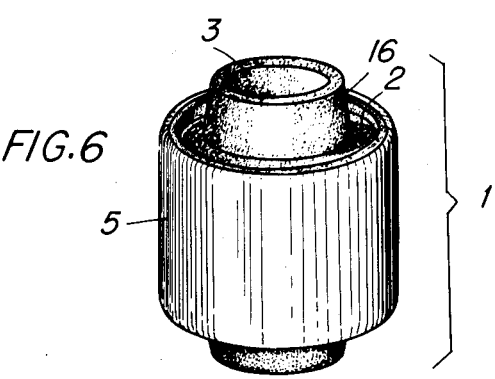

Referring first to the preferred embodiment shown in Figs. 1–6, the bushing is shown by itself in Fig. 6. Essentially the bushing 1 is a rubber sleeve or cylinder, but in the form shown in both the embodiments of this application it is built as follows. The outside is a thin metal shell 5. The body 2 of the bushing is vulcanized rubber whose outside surface is preferably cemented, vulcanized or otherwise fixed with relation to the metal shell 5. The rubber has an axially central opening 3 in which is placed the connection with a moving element or tube 10 carrying the vibrating table of the exciter. At each end the rubber extends beyond the shell an appreciable distance. This increases the area of contact with the axially central connection and provides a buffer and spacer where the bushing is carried on the tube or the like. The degree of stiffness of the rubber body can be set to give low torsional stiffness, if desired. I have found that by proper shaping of the bushing along with the proper stiffness and the manner of mounting hereinafter described, a soft suspension free from resonances involving radial motion can be obtained through a frequency range from 0 to 1000 cycles per second.

The stationary group of parts includes a mounting base 4 carrying a stationary group of parts having a magnetic structure 7. The parts are pivoted on the base 4 by means of trunnions 6. The magnetic structure 7 contains direct current field coils 8. A shake table 9 is supported above the structure 7 on a moving element 10 which passes through the center of the structure 7. (Hereafter I shall refer to the moving element 10 as the tube, when describing the embodiments of the drawings.) The alternating current driver coil 11 is mounted on the lower end of the vertical tube 10. The coil lies in a position opposite the structure 7 in order that it may interact with the magnetic field and cause reciprocation of the tube and table. My invention concerns the mounting means for the tube. The tube, of course, is the moving element of the exciter.

The tube is mounted on the structure 7, being so connected to it that the tube can reciprocate in a linear direction. The tube is preferably supported near the top and bottom, and the movement is obtained by torsion of the rubber sleeve or inner member 2 of the bushing or bushings 1 with relation to the metal shell 5 or outer member of the bushings. There is a pair of rigid arms 12 connected near the bottom of the tube and another pair near the top. A rubber bushing 1 is preferably employed at each end of each arm so that the arms are pivoted at each end. Some of the advantages of the invention can be obtained if bushings are used at only one end of each arm. One arm end 13 of each arm is shown clamping the arm to the outer member or shell 5 of a bushing. Passing through the axial opening 3 in each bushing is the means connecting the bushing to the other element to which the bushing is attached. In the case of the bushings carried by the tube 10 this is a screw 14. The head of the screw bears against one protruding end 16 of the sleeve 2. The screw takes into a mounting ring 15 on the tube 10 and thus squeezes the other end of the sleeve against the tube. Thus the bushing is held against the tube in a radial manner by its inner or rubber member 2 in a plane normal to the length of the tube. The outer surface is gripped by the end 13 of the arm 12 through the shell 5.

The outer end of each arm 12 is associated with the stationary group of parts of the exciter in a special pivotal relation. Bolted to the top and bottom of the magnetic structure 7 are supports 17, 18 extending respectively upwardly and downwardly from the magnetic structure 7. On the outer end of each support, extending vertically away further from the magnetic structure, is a bracket 19 to which the outer end of each arm is pivoted by means of a screw 20. This screw 20 lies in a horizontal plane and passes through the axial opening 3 of the bushing. This holds the inner surface of the rubber 2 of the bushing against axial rotation. The outer end 13 of each arm clamps the shell 5 of the bushing 1, and therefore the outer surface of the rubber, axially. It will be seen that if the vertical tube 10 reciprocates longitudinally, the outer end of the arm will swivel or hinge about the horizontal screw 20 by means of torsion in the rubber of the bushing. Similarly at the center of the machine, the torsion of the rubber sleeve there will permit the vertical tube and the arm to pivot with relation to each other. It will be seen that the axis of the bushing in either end of the arms is oriented with relation to the arm so that the desired motion of the moving table causes concentric rotation of the outer element of the bushing relative to the inner element of the bushing. Our bushing and its manner or placement in our configuration is such as to prevent rotational modes in any direction except in a plane normal to the axis of the bushing. Because there is a pair of arms at not only the top but preferably also near the bottom of the tube, any pull due to the magnetic fields will give the tube only a reciprocatory linear movement, but the support means comprising the arms and bushings will restrain movement of any other kind. In this way each rod and bushing assembly is substantially free of motion in planes normal to the length of the moving element but capable of pivoting with respect to the moving element.

One feature of my mounting means is the geometrical relation of the arms, bushings and tube. The two arms of each pair, which of course are close to the tube at the center of the machine, are considerably further apart at their outer ends. As shown, for example, in Fig. 2, the supports 17, 18 are radially arranged at an angle where they diverge from each other by say 50°. The rigid arms 12 substantially follow the supports 17, 18. By thus arranging the arms at complemental converging angles as they approach the tube, they provide a component of rigidity against non-linear movement for the tube. In the preferred embodiment of Figs. 1–6, the clamping ends of the arms are in line with the main parts of the arms and therefore they grip the metal shells 5 of the bushings at an angle in directions which are symmetrical with respect to the center line of the tube assembly. This minimizes any tendency toward rotational movement of the tube about its own axis.

Figure 1:
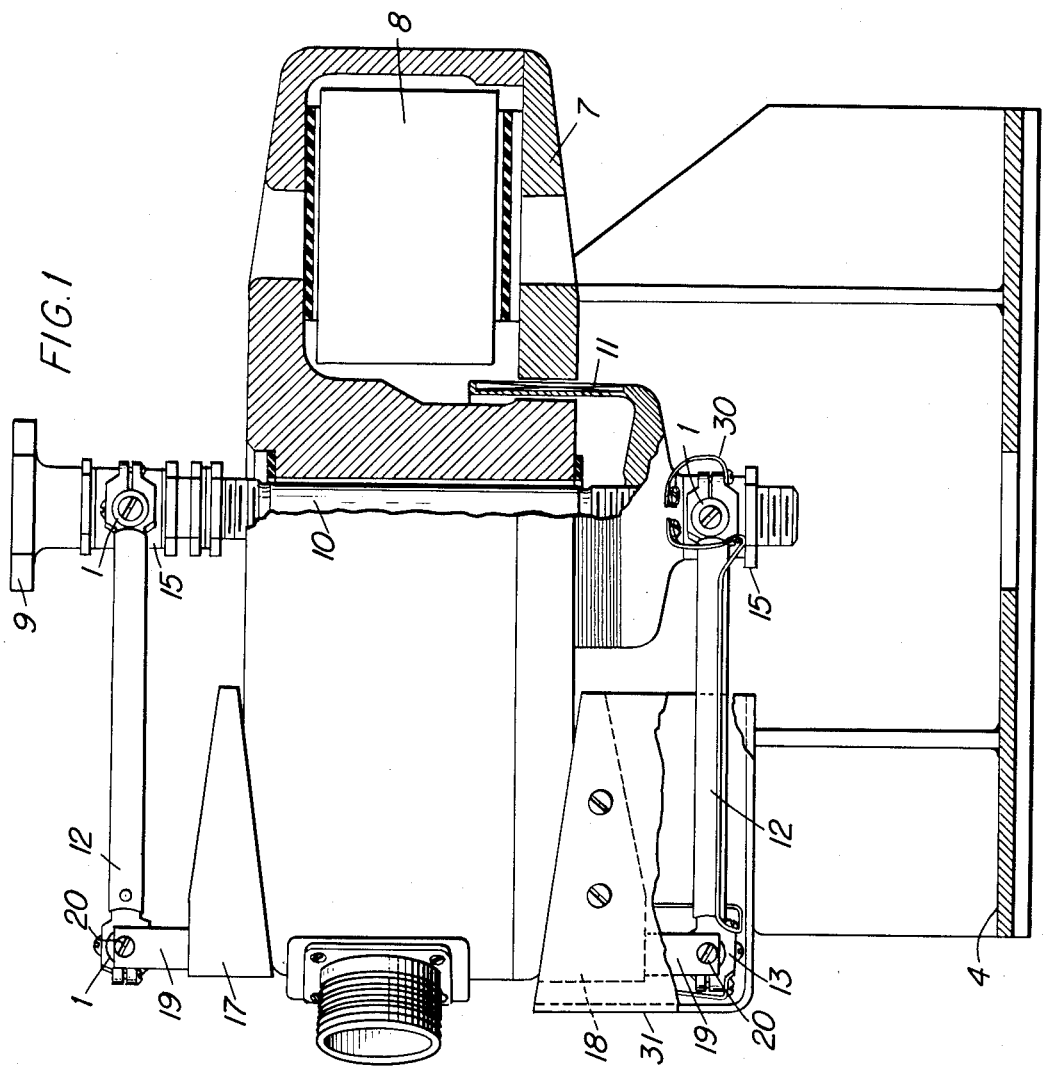
Fig. 1 is a view in side elevation, partly broken away, of a vibration exciter in which a preferred embodiment of my support means is shown.
Figure 2:
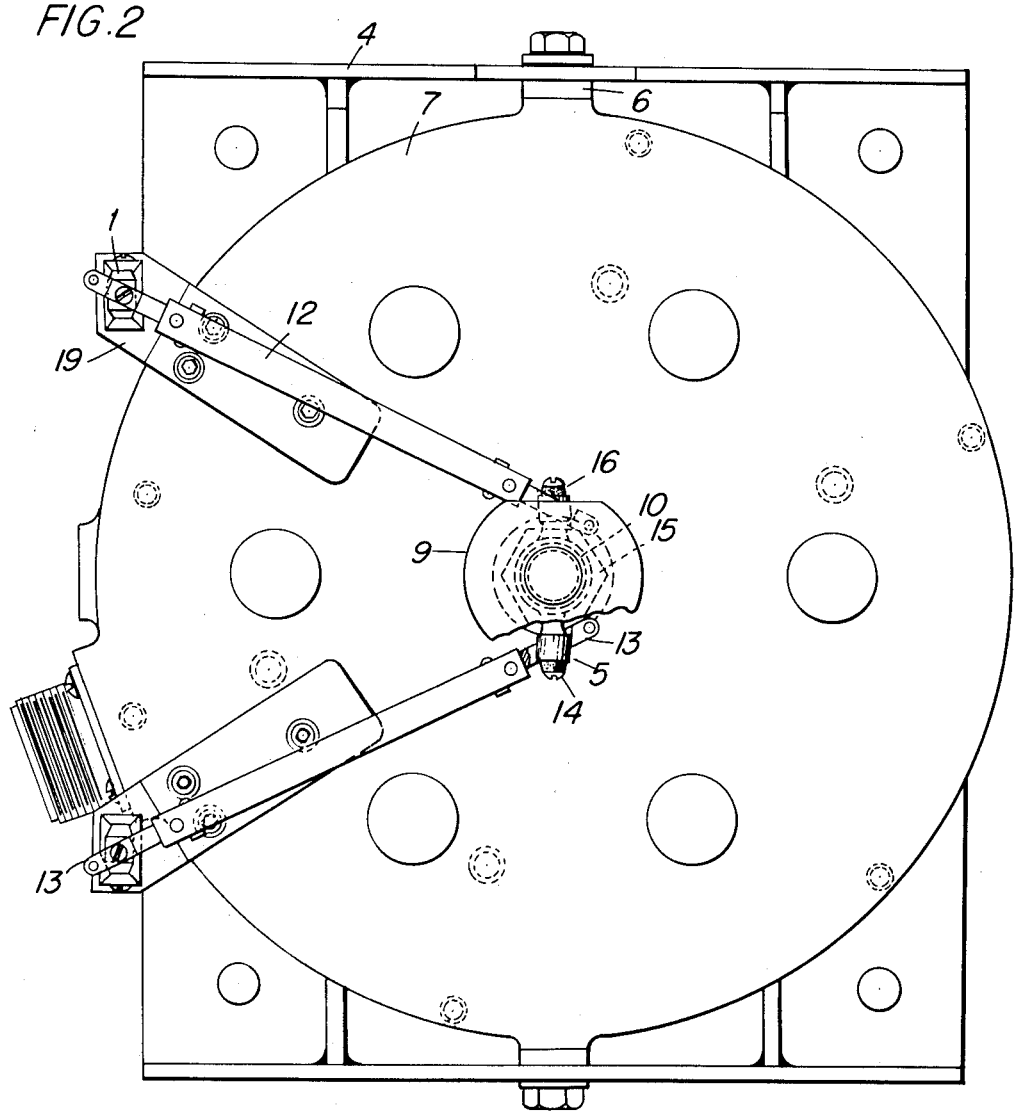
Fig. 2 is a plan view of the exciter of Fig. 1 with part of the vibration table broken away to show how one of the bushings is carried by its arm.
Figure 7:
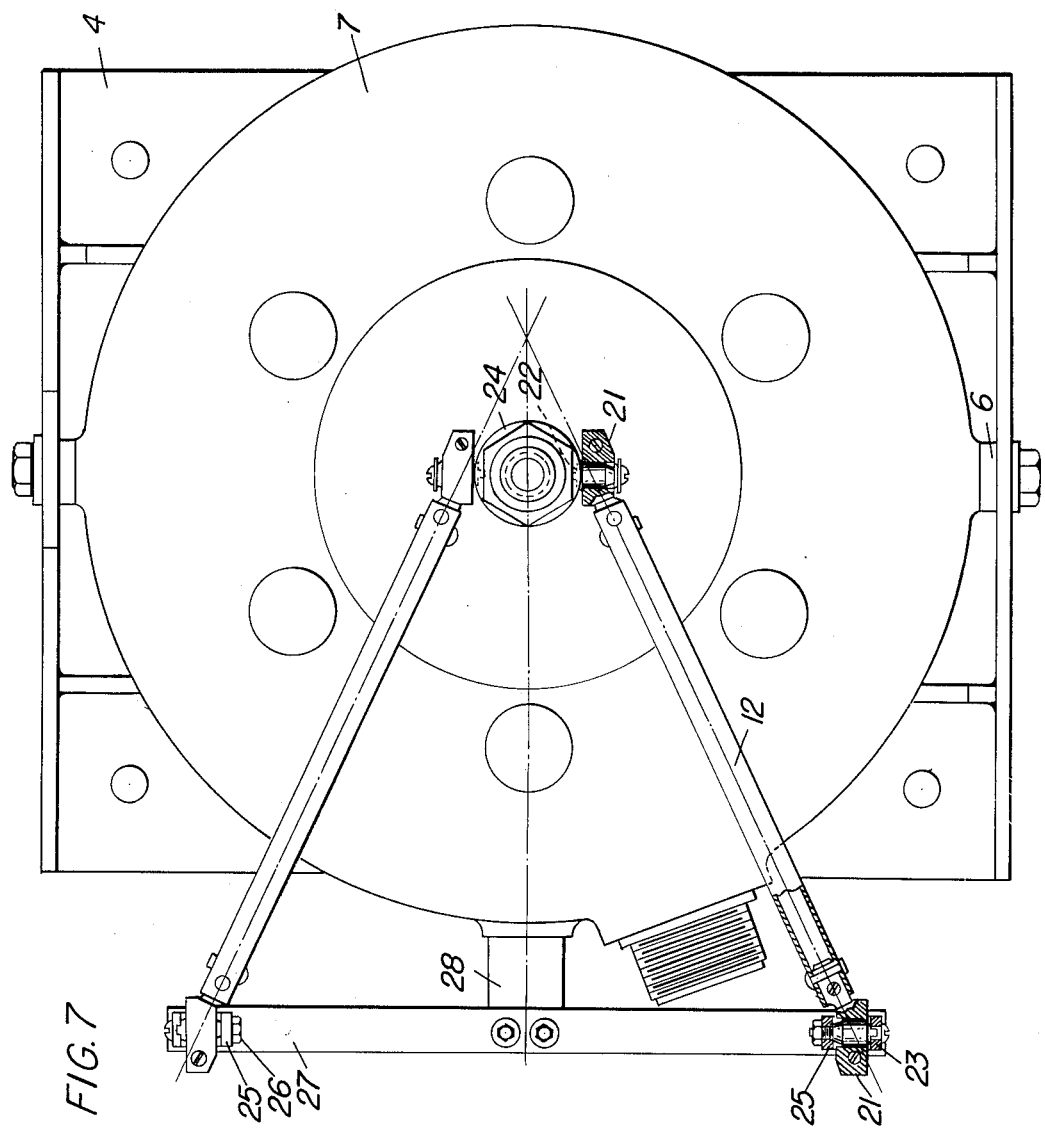
Fig. 7 is a plan view of an exciter in which an alternate embodiment of rubber bushing support means according to my invention is shown.

In Fig. 7 is shown a functionally simpler mounting means in which the ends of the arms are normal to the axis of rotation of the bushing. The ends 21 of the arms in this figure are set in directions normal to the bushings with which they are associated and since, as in the preferred embodiment of Figs. 1–6, two bushings are used at diametrically opposite points on the vertical tube 10, the ends 21 are parallel to each other at the tube. The other ends of the arms are also parallel to each other. I have found it useful in this particular embodiment to have a projecting vertical rib 22 of rubber on one end of the rubber part 2 of the bushing 1. I associate this rib with a special grooved washer 23 in the case of the bushings at the outer ends of the arms, and with a special grooved mounting ring 24 in the case of the ends associated with the vertical tube. This prevents slippage of the rubber body 2 under torsional strain. A slightly different form of bracket and support than in Fig. 2 is employed to connect the arms to the stationary group of parts, as shown in Fig. 7. This altered construction comprises an upstanding yoke 25 whose upper end appears in section with a screw 26 passing through the yoke, the washer 23, and the bushing holding them together, so that reciprocatory movement of the vertical tube will cause torsion of the rubber in this bushing. The bracket is mounted on a support 27 joining the yokes for the outer ends of the two arms of the pair, the two arms making equal angles with a line which is perpendicular to the axes of the parallel bushings and of the line of the moving element, as in the case of the embodiment of Figs. 1–6. This support 27 can be carried by the stationary magnetic structure 7 by any desired means, but I have shown it connected by a single bracket 28 at the center of the support.

By using rubber bushings and support means associated therewith in the manner described, there is no free play, no giving of extraneous motions to the table, no moving parts. Galling due to vibratory motion is entirely eliminated, and the torsional stiffness of the mounting can be made as low as desired to give a soft suspension. The bearings also are inherently a means of giving both elastic restraint and damping. Thus the pivotal type of flexure is obtained without the disadvantages ordinarily associated therewith. It will be noted also that the inherent damping quality of the rubber not only eliminates internal resonance in the bushing itself, but also provides a damping to the motion of the moving elements. This is very desirable in cases where it is desired to limit the resonant response of the supporting tube assembly.

The rubber bushings are exceedingly small, which adds only a minimum of weight to the tube assembly, the latter being extremely light. This also is of value in keeping the resonances in the tube itself above the operating range of the exciter.

It should further be noted that the rubber or inner member of each of the bushings is so arranged that each end of each arm is electrically insulated from the structure to which the end is connected. Therefore it is possible for the tube to be used as a current-carrying member without any further parts. Thus, for example, in the embodiment of Figs. 1–6, the wires 29, 30 are for the purpose of thus carrying the current in connection with the formation and maintenance of the magnetic fields. Shields 31 may be employed to cover the rods and associated wires at the bottom, if this seems desirable.

What I claim is:

1. In a vibration exciter, a group of stationary parts, a moving element adapted to have linear reciprocatory movement, and means mounting said moving element on the group of stationary parts; the mounting means comprising arms each extending from the group of stationary parts to the moving element in combination with rubber cylindrical bushings at at least one end of each arm, each arm being attached at one end to one surface of a bushing and the moving element to the other surface of that bushing, whereby torsion of the rubber cylindrical bushings provides a hinged mounting of the moving element for linear reciprocations of the latter but prevent rotational modes in any direction other than in a plane normal to the axis of the bushings.

2. In a vibration exciter, a group of stationary parts, a moving element adapted to have linear reciprocatory movement, and means mounting said moving element on the group of stationary parts; in combination with rubber cylindrical bushings mounted on and projecting laterally from the moving element in a parallel manner, the mounting means including an arm attached to each bushing on the opposite face of the rubber from the moving element and attached to the group of stationary parts; whereby torsion of the rubber in the bushings permits the latter to act as hinges only in a plane normal of the axes of the bushings when the moving element reciprocates.

3. A vibration exciter according to claim 2 in which the bushings project oppositely from the moving element, and the arms make equal angles with a line perpendicular to the axis of the bushings; whereby rotational motions of the moving element about its longitudinal axis are minimized.

4. In a vibration exciter, a group of stationary parts, a moving element adapted to have linear reciprocatory movement, and means mounting said moving element on the group of stationary parts, the mounting means comprising arms each extending from the group of stationary parts to the moving element in combination with parallel rubber cylindrical bushings at each end of each arm providing pivoted connections between the moving element, the mounting means, and the group of stationary parts without permitting any movement other than concentric rotation of the outer elements relative to the inner elements of the bushings.

5. A vibration exciter having a group of stationary parts, a moving element adapted to have linear reciprocatory movement, and means mounting said moving element on the group of stationary parts, the mounting means comprising arms adapted to connect the moving element to the group of stationary parts, in combination with rubber cylindrical bushings having inner and outer surfaces connected on the one surface to the arms and on the other surface to the group of stationary parts on the moving element respectively, whereby linear reciprocation of the moving element causes the bushings to pivot the ends of the arms by torsion of the rubber without permitting any movement other than concentric rotation of the outer elements relative to the inner elements of the bushings.

6. In a vibration exciter, a group of stationary parts, a moving element adapted to have linear reciprocatory movement, and means mounting said moving element on the group of stationary parts, the mounting means comprising in combination one or more pairs of arms, each arm extending from the moving element to the stationary group, and rubber bushings which are parallel to each other hinging the arms to the stationary group and to the moving element; the arms making equal angles with a line which is perpendicular to the axes of the bushings and of the line of the moving element, whereby non-linear movement of the moving element is prevented.

7. In a vibration exciter, a group of stationary parts, a moving element adapted to have linear reciprocatory movements, pairs of complemental arms extending between the stationary group of parts and the moving element at at least two points on the length of the latter, in combination with rubber cylindrical bushings connecting the arms to the moving element and the stationary group of parts in such manner that each arm and bushing assembly is substantially free of motion in planes normal to the length of the moving element but capable of pivoting with respect to the moving element.

8. In a vibration exciter, a group of stationary parts, a moving element adapted to have linear reciprocatory movement, and means mounting said moving element on the group of stationary parts, the mounting means comprising arms each extending from the moving element to the stationary group of parts and rubber cylindrical bushings lying in a plane at right angles to the direction of reciprocation of the moving element, the inner and outer surfaces of the rubber being held, the one by the moving element and the other by the arms, whereby any linear reciprocation of the moving element is obtained by the torsion of the rubber but rotational modes in any direction except in a plane normal to the axis of the bushings is prevented.

9. In a vibration exciter, a group of stationary parts having magnetic elements therein, a moving element adapted to have linear reciprocation, a shake table carried thereby, a driver coil on the moving element, and means mounting the moving element on the group of stationary parts, the mounting means comprising arms adapted to mount the moving element on the stationary parts, in combination with rubber cylindrical bushings which are parallel to each other hinging the ends of the arms to the moving element and the stationary group of parts and isolating the arms electrically therefrom, the arms making equal angles with a line which is perpendicular to the axes of the bushings and of the line of the moving element, thereby preventing rotational modes in any direction except in a plane normal to the axes of the bushings.

References Cited in the file of this patent

UNITED STATES PATENTS

| | | |
|---|---|---|
| 2,194,535 | Von Delden | Mar. 26, 1940 |
| 2,206,244 | Weyandt | July 2, 1940 |
| 2,297,084 | Swallow | Sept. 29, 1942 |
| 2,359,245 | Ritzmann | Sept. 26, 1944 |
| 2,393,141 | Butterfield et al. | Jan. 15, 1946 |
| 2,439,219 | O'Connor | Apr. 6, 1948 |
| 2,450,279 | Guy | Sept. 28, 1948 |
| 2,466,807 | Hein | Apr. 12, 1949 |
| 2,553,391 | Tyler | May 15, 1951 |
| 2,599,036 | Effromson | June 3, 1952 |

FOREIGN PATENTS

| | | |
|---|---|---|
| 968,283 | France | Apr. 12, 1950 |